United States Patent
Keck et al.

[11] Patent Number: 5,636,300
[45] Date of Patent: Jun. 3, 1997

[54] MXO MULTIPLEX DEMULTIPLEX COMPONENT

[75] Inventors: Donald B. Keck, Big Flats; William J. Miller; Daniel A. Nolan, both of Corning, all of N.Y.

[73] Assignee: Corning Incorporated

[21] Appl. No.: 353,822

[22] Filed: Dec. 12, 1994

[51] Int. Cl.⁶ .................................................. G02B 6/28
[52] U.S. Cl. ........................... 385/24; 385/30; 385/43; 385/46
[58] Field of Search .................... 385/24, 30, 37, 385/32, 43, 39, 46, 20, 42; 359/127, 129, 130

[56] References Cited

U.S. PATENT DOCUMENTS

| | | | |
|---|---|---|---|
| 4,556,279 | 12/1985 | Shaw et al. | 385/30 X |
| 4,606,020 | 8/1986 | Ruffin | 385/51 |
| 4,708,424 | 11/1987 | Marhic | 385/30 |
| 4,768,850 | 9/1988 | Moslehi et al. | 385/30 X |
| 5,064,263 | 11/1991 | Stein | 385/14 |
| 5,119,453 | 6/1992 | Gonthier et al. | 385/43 |
| 5,136,671 | 8/1992 | Dragone | 385/46 |
| 5,170,451 | 12/1992 | Ohshima | 385/43 |
| 5,295,205 | 3/1994 | Miller et al. | 385/43 X |
| 5,355,426 | 10/1994 | Daniel et al. | 385/30 X |
| 5,400,421 | 3/1995 | Takahashi | 385/30 X |
| 5,408,555 | 4/1995 | Fielding et al. | 385/43 |
| 5,422,968 | 6/1995 | Hanatani et al. | 385/24 |
| 5,440,416 | 8/1995 | Cohen et al. | 385/24 X |

*Primary Examiner*—Rodney B. Bovernick
*Assistant Examiner*—Hemang Sanghavi
*Attorney, Agent, or Firm*—William J. Chervenak

[57] ABSTRACT

An M×O multiplex/demultiplex device is disclosed. An M×N coupler is connected to an N×O coupler by phase shifting means. The phase shifting means provide N paths between the couplers, each path having an optical path length different from every other optical path length. The coupling region of the M×N coupler must provide for substantially uniform division of light power among the coupler branches when M are the launch ports. Similarly, the coupling region of the N×O coupler must provide for substantially uniform division of light power among the coupler branches when O are the launch ports. A preferred embodiment includes two fused waveguide fiber couplers with dissimilar waveguide fibers used as the phase shifting means.

12 Claims, 3 Drawing Sheets

MXO MULTIPLEX DEMULTIPLEX COMPONENT

BACKGROUND

The invention relates to an M×N multiplex/demultiplex device suitable for single mode telecommunication systems using wavelength division multiplexed signals.

The principles of a Mach-Zehnder filter are described in patent application Ser. No. 08/052,523. In that application, wavelength filtering is accomplished by coupling light comprised of a plurality of wavelengths into N optical paths. The power is divided substantially equally among the N paths. Each optical path has a different length or propagates light of a given wavelength at a different speed. An alternative statement is, each path has a different optical path length for a given light wavelength. Because the optical path lengths are different, the light undergoes a different phase shift along each path.

The phase shifted light from each path is coupled into a single path where constructive and destructive interference occur. The optical path lengths are pre-selected to give constructive interference for particular light wavelengths and destructive interference for other light wavelengths. In this way, a pre-selected light wavelength is filtered out of the light signal. Note that the interference occurs when the light signals are coupled into a single path. That is, the coupling occurs at a spatial location, i.e., the location of the single output path. Hence the filtering depends upon both light frequency and the spatial relation of the filter components.

This principle of phase shifting by means of choosing a particular optical path length can also be applied to wavelength division multiplexing and demultiplexing. However, pre-selecting optical path lengths to give the proper phase shifts is more difficult. In multiplexing or demultiplexing, a plurality of wavelengths must be selected to constructively interfere, because information is being carried by each of a plurality of wavelengths.

In U.S. Pat. No. 5,234,672, Dragone, multiplexing or demultiplexing is accomplished using two star couplers connected by a set of optical waveguide paths denoted a grating. "The grating located between the two star couplers essentially consists of an array of curved waveguides of different length." (Col. 1, ll. 42–44.) The difference in optical path length of light traversing the grating produces the interference which can result in multiplexing or demultiplexing. The problems encountered in making such a device include all those related to the design and manufacture of a star coupler. In addition, the grating paths must be arranged to limit phase error introduced by coupling between optical paths located close to each other. Further, the coupling of light between a planar waveguide, such as an output or input of a star coupler, and an optical waveguide fiber is a difficult, exacting task.

Thus there is a need for a coupling device which limits cross coupling phase errors among the optical paths.

In addition, an effective multiplexer or demultiplexer must satisfy a number of criteria, such as:

low attenuation;
sufficient signal separation;
environmental stability;
mechanical stability; and,
compatibility with an optical waveguide fiber system.

Because the multiplexer/demultiplexer includes at least one coupler, system compatibility includes coupler to waveguide fiber coupling. Thus, a multiplexer/demultiplexer device having a coupler comprised of waveguide fibers is more compatible with a waveguide fiber telecommunications system and is preferred.

Multiplexing is a cost effective method of increasing the capacity of installed fiber optic networks. Communications networks can be upgraded without disturbing or adding to the optical cable transmission system. As demand for telecommunications capacity increases, multiplexed systems have become more attractive. The search for low attenuation, reliable and, preferably, economical and easy to manufacture, multiplex and demultiplex devices has intensified.

DEFINITION

The term, optical path length, is used to describe the effective distance traveled by light in a waveguide. The optical path length of a segment of waveguide, characterized by effective refractive index $n_{\mathit{eff}}$ is given by $n_{\mathit{eff}} \times d$, where d is the length of the waveguide segment measured by conventional means. The phase velocity of light traversing the waveguide segment is the optical path length divided by the transit time of light through the waveguide segment.

The effective refractive index, $n_{\mathit{eff}}$, of a waveguide, in general, depends upon light wavelength as well as the propagation constant of the waveguide. Thus, optical path length will, in general, be different:

for different wavelength light;

for a different stress pattern in the waveguide;

for different dopants or dopant amount in the waveguide; and, for different waveguide geometry, such as, core diameter The term % refractive index delta or simply refractive index delta refers to an optical waveguide and as used herein is defined, $$delta = 100 \times \{(N_1^2 - n_2^2)/2n_1^2\},$$

where $n_1$ is the peak refractive index of a core region and $n_2$ is the refractive index of the clad layer.

SUMMARY OF THE INVENTION

The present invention meets the need for a simple and reliable multiplex and demultiplex device which is easily inserted into a single mode optical waveguide fiber system.

A first aspect of the invention is a single mode device for wavelength division multiplexing and demultiplexing including an M×N evanescent wave coupler, an N×O evanescent wave coupler, and means for connecting together the N output ports of one coupler to the N input ports of the other coupler. Each coupler must provide a substantially uniform division of input light power among the plurality of outputs. That is, light power from each of the M inputs of the M×N coupler must be divided into substantially N equal parts for delivery to the N outputs. When the N×O is used as the input coupler, light power from each of the O inputs must be divided into N substantially parts.

The terms input and output must be distinguished for the inventive device operated as a multiplexer as compared to the same device operated as a demultiplexer. As used herein, demultiplexing occurs when light containing at least two signal wavelengths is launched into one port of the first evanescent wave coupler. Multiplexing occurs when at least two signal wavelengths are launched into separate input ports of the second coupler. Furthermore, to multiplex and demultiplex using the inventive device, the signal wavelengths must be launched symmetrically. That is, a particular wavelength signal will always be launched into or emerge from the same port of a given coupler. This reciprocity of multiplexing and demultiplexing is made clear in the examples below.

The connecting means are N optical transmission paths, each of which produces a phase shift, in the light propagated, which is different from the phase shift produced in every other optical path. That is, each transmission path has an optical path length different from the optical path length of every other transmission path.

The couplers may include lens and mirror elements or may be a fused fiber device or a planar waveguide device based upon evanescent wave coupling.

A preferred embodiment of the inventive multiplexer includes at least one fused optical waveguide fiber coupler as described in U.S. Pat. No. 4,983,195. One of the couplers has M input fibers and N output fibers. The other coupler has N input and O output fibers. The transmission paths between the two couplers are waveguide fibers each of which has an optical path length different from every other waveguide fiber in the transmission path.

In this embodiment of the invention the optical waveguide fibers comprising the connecting means between the couplers may have different refractive index deltas to provide unique optical path lengths for each waveguide fiber. As an alternative, the optical path lengths may also be made unique by varying the core diameter of the waveguide fibers which are chosen to have equal length. In those cases wherein the optical path length difference is produced by means of differences in refractive index delta or waveguide geometry, such as core diameter, the difference may exist along an entire connecting waveguide fiber or any segment or segments thereof.

Also the optical path length may be varied by varying the length of waveguide fibers which are otherwise identical.

Several means of varying optical path length are available. These include:

photon induced refractive index change along all or part of the connecting fiber lengths;

thermally induced refractive index change along all or part of the connecting fiber lengths;

refractive index change induced by electro-optic interaction along all or part of the connecting fiber lengths; and, stress induced refractive index variation along all or part of the connecting fiber lengths, where the stress may be induced thermally, mechanically or by like means.

It is contemplated that a particular multiplexer/demultiplexer device may be tuned to yield better signal separation or signal to noise ratio by including means to adjust, during operation, the phase shift induced by one or more of the phase shifting optical paths. Such means of adjusting phase shift include any of those means mentioned above with regard to varying optical path length of the connecting waveguides.

When used as a demultiplexer, light signals of different wavelengths are delivered to at least one of the M inputs of the M×N coupler. The input light power is divided substantially equally among the N outputs. The function of the connecting means, for connecting the N output ports of the M×N coupler to the N input ports of the N×O coupler, each of which has a different optical path length, is to provide for constructive interference of a particular wavelength of light coupled into a particular output port of the N×O coupler.

Because the optical path lengths of the connecting means are in general wavelength dependent, each wavelength of the wavelength multiplexed signal can be made to constructively interfere when coupled to a pre-selected output port. It is understood in the art that constructive interference will occur for a periodic family of wavelengths. In general, the first order constructive interference is of principle interest in the context of a multiplexer/demultiplexer which has substantial separation of signal and noise levels.

The device functions as a multiplexer when the inverse of the demultiplexing operation is carried out. For example a different one of O distinct wavelengths may be launched into the O ports of the N×O coupler. The wavelength launched at a particular port must correspond to the wavelength emerging at that port in the demultiplexing operation.

It will be understood that there is a spatial reciprocity between the multiplex and demultiplex functions due to the inherent spatial dependence of the interference phenomenon. For example, consider a demultiplex device wherein wavelength $I_1$ emerges from the first output port of the N×O coupler, $I_2$ emerges from the second output port, and so on to the final port where $I_O$ emerges. To obtain multiplexed signals from the M outputs of the M×N coupler, $I_1$ must be launched into the first pod of the N×O coupler, $I_2$ into the second port and so on until $I_O$ is launched into the final port. It is not necessary that a light signal be launched into each port. It is necessary that the correspondence between a particular port of each of the M×N and N×O couplers and a particular wavelength signal be maintained.

DETAILED DESCRIPTION OF THE INVENTION

The drawings are not necessarily to scale and are in no way intended to limit the invention.

Figure 1:
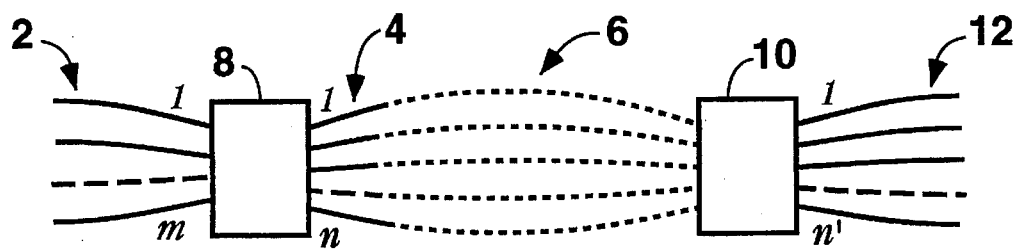
FIG. 1 is a schematic of an M×N multiplexer/demultiplexer.

The schematic illustration in FIG. 1 shows the main features of the invention. One or more wavelengths of light may be launched into the M inputs, 2, of coupler 8. Coupler 8 divides the launched power from each input 2 into N substantially equal parts for transmission by outputs 4.

Outputs 4 are joined to the phase shifting elements 6 which feed light into the N inputs of coupler 10. Each element 6 shifts the phase of the transmitted light by an amount different from every other element 6. In coupler 10, from each input light a particular wavelength couples, in phase, to one of outputs 12. The amount of phase shift for each element 6 is chosen such that constructive interference occurs in a selected one output 12 for only one wavelength. The light of other wavelengths interferes destructively in the selected one output. Thus each output 12 transmits a single wavelength from among the wavelengths launched into inputs 2, thereby demultiplexing the launched signals.

The device functions as a multiplexer when a different one of N wavelengths is launched respectively into the O ports 12 of coupler 10. In this case, the multiplexed signals emerge from ports 2.

Figure 2:
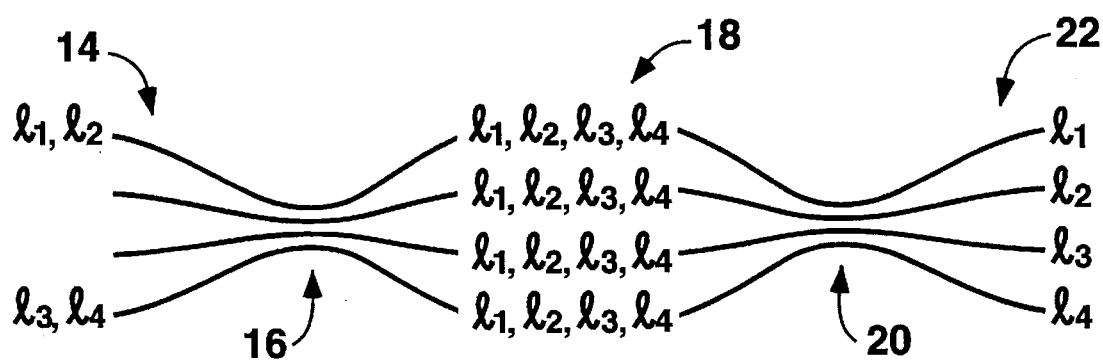
FIG. 2 is a schematic of a 4×4 multiplexer/demultiplexer having wavelengths multiplexed on two coupler branches.

A 2×4 multiplexer/demultiplexer is shown schematically in FIG. 2. Signals of wavelength $I_1$ and $I_2$ are launched into a first of ports 14 of coupler 16. Signals of wavelengths $I_3$ and $I_4$ are launched into a second of ports 14. The signals propagate along the phase shifting elements 18. Each of elements 18 carries all four wavelengths. The launched power of each wavelength is divided substantially equally among the elements 18. The signals are recombined in coupler 20 and delivered to ports 22. The respective wavelengths $I_1$, $I_2$, $I_3$ and $I_4$ interfere constructively in only one of ports 22. Thus each of ports 22 transmits only one wavelength.

To use the device illustrated in FIG. 2 as a multiplexer, a different one of the signals having wavelengths $I_1$, $I_2$, $I_3$ and $I_4$ is launched into the respective ports 22 of coupler 20. After phase shifting in elements 18 and passing through coupler 16, signals of wavelength $I_1$ and $I_2$ will interfere constructively in one branch of the coupler and be transmitted at one of ports 14. In like manner, signals of wavelength $I_3$ and $I_4$ will be transmitted at the other of ports 14. Note the reciprocity of the multiplex and demultiplex function. For example, $I_1$ must emerge from or be launched into the same one of ports 14 and of ports 22. This same reciprocity applies for wavelengths $I^2$, $I_3$ and $I_4$.

The function of the multiplex/demultiplex device depends upon choosing the proper optical path length for each of the phase shifting elements, 6 in FIG. 1 and 18 in FIG. 2. The set of equations which describe the proper optical path length are non-linear and are typically solved using a trial solution, iterative technique, preferably with the aid of a computer.

The equations for a 2×2 multiplex/demultiplex device are given in *Fiber Optic Networks*, Paul E. Green, Prentice Hall, 1993. Using the notation and matrix formalism of Green, the equations for a 1×N multiplex/demultiplex device may be written. The device comprises a 1×N coupler, an N×N coupler and N phase shifting elements connected between the two couplers.

A matrix may be use to describe the phase shift caused by the N phase shifting elements. The matrix has dimension N×N and has only diagonal entries because there is no coupling of light power among phase shifting elements. The phase shift matrix [P] has elements, $$[P]_{rs} = \exp(i\delta(a_r)z/I),$$

when r=s, and, $$[P]_{rs} = 0,$$

when r≠s, where r=1,2, . . . N. The term $\delta(a_r)$ is the incremental angle of phase shift introduced by the rth phase shift element on a signal of wavelength I. Z is length along the waveguide. There is a [P] matrix for each distinct wavelength of light launched into the 1×N coupler. The [P] matrix operates on an N×1 vector, which describes the electromagnetic field launched into the 1×N coupler, to yield the phase shifted fields which arrive at the N×N coupler.

A scattering matrix [S], which describes the amplitude and phase of the fields propagated in the N×N coupler, is in general not diagonal because there is coupling among the N branches when light passes through the N×N coupler. The elements of [S] are found by applying the criteria:

light is divided substantially equally among the N outputs for each light wavelength;

the direction of travel of the light is not material so that $[S]_{rs} = [S]_{sr}$; and, energy is conserved in the coupler so that $[S]^*[S] = [I]$, where [I] is the unit matrix, $[S]^*$ is the conjugate matrix and [S] is normalized to unity.

The matrix [S] acts upon the N×1 vector representing the electromagnetic field launched into the N×N coupler. There can be an [S] matrix for each wavelength launched. However, in some cases [S] may be wavelength independent (see example below).

If [E] is the field launched into the 1×N coupler, then the field at the output ports of the N×N coupler, [X], is given by the matrix equation, $$[X] = [S_2][P][S_1][E].$$

In this equation, $[S_1]$ provides for the division of [E] among the N output ports. [P] gives the phase shift of the fields in the N phase shifting legs. $[S_2]$ provides for the division of the fields among the N final outputs.

This formalism may be used to describe an MXO multiplexer/demultiplexer. Such a device would comprise an M×N coupler, N phase shifting elements and an N×O coupler. In fused waveguide fiber coupling devices, the relative number of input and output waveguide fibers may be changed by terminating particular waveguide fibers on either side of the coupling region.

Example—A 4×4 Single Mode Multiclad Multiplexer/ Demultiplexer

Figure 3:
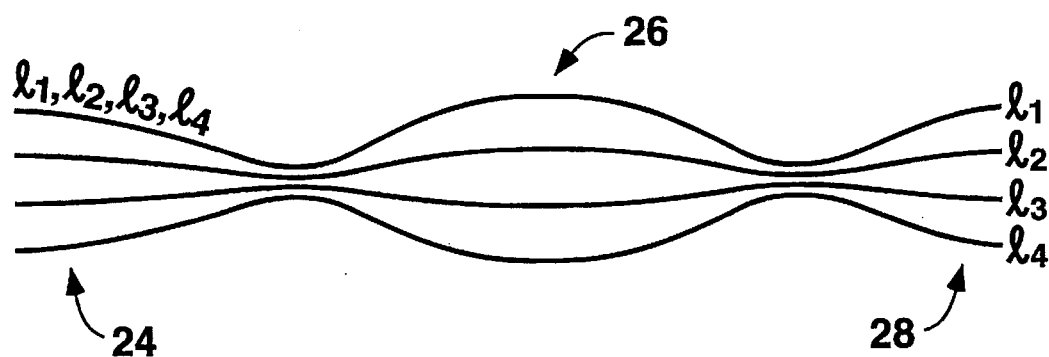
FIG. 3 is a schematic of a 4×4 multiplexer/demultiplexer having wavelengths multiplexed on one coupler branch.

With reference to FIG. 3, a four wavelength multiplexed signal is launched into one of the input fibers 24. FIG. 3 shows fields of wavelength $I_1$, $I_2$, $I_3$ and $I_4$ carried on a single input fiber of a 4×4 coupler which is preferably a multiclad coupler.

The scattering matrix which determines how the field of wavelength $I_i$, i=1,2,3,4, is divided among the four output legs of the coupler is found by applying the criteria $S_{rs}=S_{sr}$, $[S]^*[S]=[I]$, and equal division of light among the branches of the 4×4 coupler.

Let $$[S]_{rr} = C \exp(ia), \text{ for } r=1,2,3,4, \text{ and}$$

$$[S]_{rs} = C \exp(ib), \text{ for } r \neq s, \text{ and } r,s=1,2,3,4,$$

where a and b are phase angles and C is a real number. Note that the matrix satisfies, $[S]_{sr} = [S]_{rs}$. Also, if $E_i$ is the field having a wavelength $I_i$, the four component vector describing the field in the input coupler branches as shown in FIG. 3 is a column vector having a value $E_i$ in the first row and zeros in the remaining three rows. The phase angle a may be chosen as the reference phase angle and set equal to zero.

Carrying out the matrix multiplication indicated in the conservation equation, $[S]^*[S]=[I]$, and equating corresponding components yields the equations:

$4C^2=1$, and $$C^2\exp(ib)+C^2\exp(-ib)=-2C^2.$$

The first equation yields $C=(0.25)^{1/2}$. The second equation yields, $$\cos(b)=-1, \text{ so that, } b=180°.$$

Hence, a matrix [S] which satisfies the specified criteria has components, $S_{rr}=(0.25)^{1/2}$, and $S_{rs}=-(0.25)^{1/2}$ for r,s=1,2,3, 4. Note that [S] is wavelength independent.

The phase shifting branches, 26, in FIG. 3 are chosen to be equal in length and to have the respective refractive index deltas, $\Delta_j$, j=1,2,3,4. The phase shift matrix for a given wavelength I will then have components, $$[P]_{rr}=\exp 2\pi/I(\Delta_j-\Delta_1)z, j=1,2,3,4, \text{ and } [P]_{rs}=0 \text{ for } r\neq s.$$

The field [X] at the outputs 28 for an input field [E] on one leg of branches 24 is then, $$[X]=[S][P][S][E].$$

Figure 4:
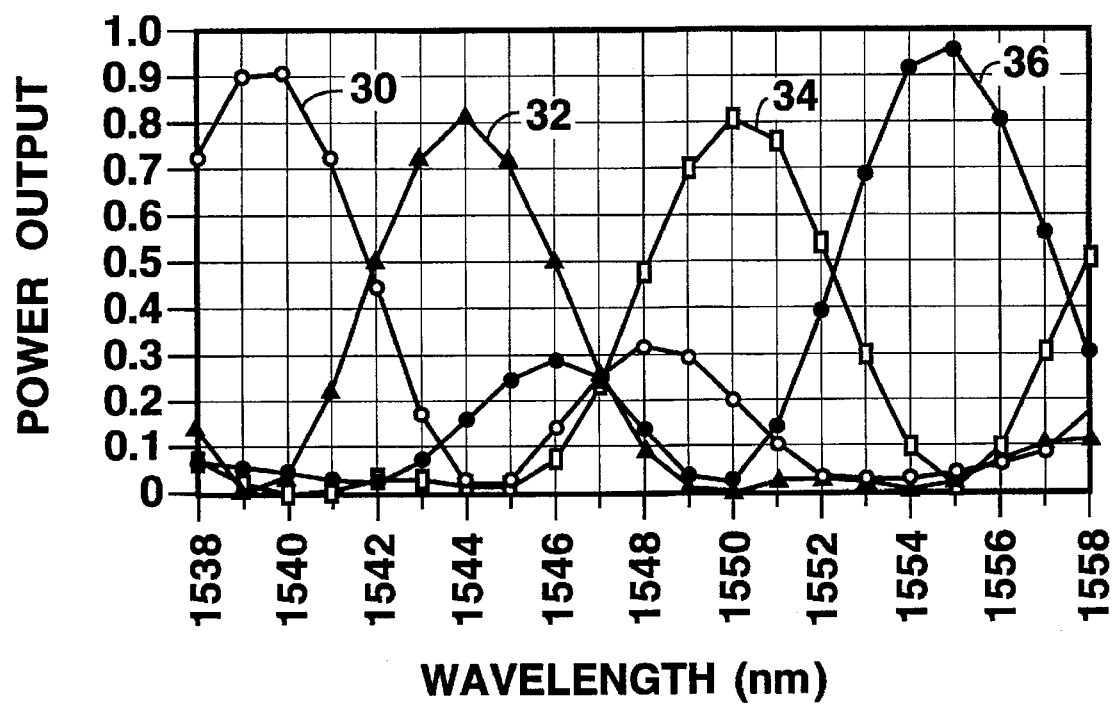
FIG. 4 is a chart of power vs. wavelength calculated for a 4×4 multiplexer/demultiplexer.

The output power is proportional to the absolute value of $[X]^2$. Using this matrix equation and a trial solution iterative technique well known in the mathematical art the $\Delta_j$'s may be found. The set of refractive index deltas which yield the power curves in FIG. 4 are: $\Delta_1=0.003000$; $\Delta_2=0.010000$; $\Delta_3=0.024000$; and, $\Delta_4=0.035025$. This choice of refractive index deltas for the phase shifting elements yields a device wherein four signal wavelengths launched simultaneously into a single waveguide fiber of one 4×4 couple would be separated into four wavelength signals which would appear at the respective four outputs of a second 4×4 coupler. In accord with the reciprocity noted above, the device would multiplex the four signals when launched into the same one of ports 28.

The normalized output power in the respective branches of the output coupler are shown in FIG. 4 as curves 30, 32, 33 and 34. The respective power peak separations are about 5 nm. The peak power relative to the noise floor is good.

Solving for [S] matrices for multiplex/demultiplex devices having more than four outputs involves a more complicated trial solution iterative process. The matrix [S] is in general wavelength dependent. Also, different coupler geometries result in different [S] martrice.

A preferred embodiment of the multiplex/demultiplex device includes overclad couplers referenced above. The equal division of light power required in the invention is readily achieved by symmetrical arrangement of a first set of waveguide fibers relative to a second set of waveguide fibers over a region whereat power couples from the first waveguide set to the second waveguide set. The symmetrical geometry of the two waveguide set essentially assures the symmetrical coupling of power.

Figure 5A:
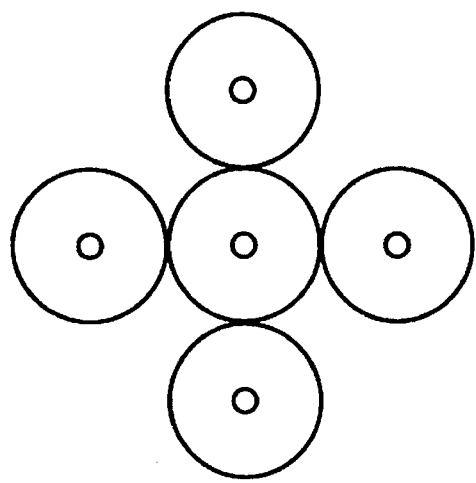
FIG. 5a is an end view of a 1×4 fused fiber coupler, prior to fusing, showing symmetrical arrangement of the waveguide fibers in the coupling region.

The symmetrical arrangement of four waveguide fibers about a single waveguide fiber in a 1×4 overclad coupler is shown in FIG. 5a. The overcladding body is not shown. Although an overclad fused fiber coupler is preferred, a fused coupler having no overcladding may be used.

Figure 5B:
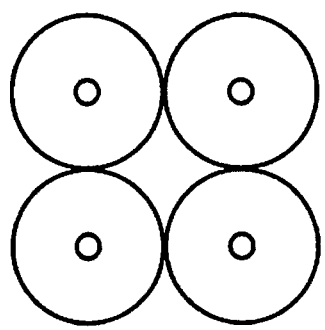
FIG. 5b is an end view of a 4×4 fused fiber coupler, prior to fusing, showing the symmetrical arrangement of the waveguide fibers in the coupling region.

The symmetrical arrangement of four fibers in the coupling region of a 4×4 coupler, prior to tapering, is shown in FIG. 5b.

Figure 5C:
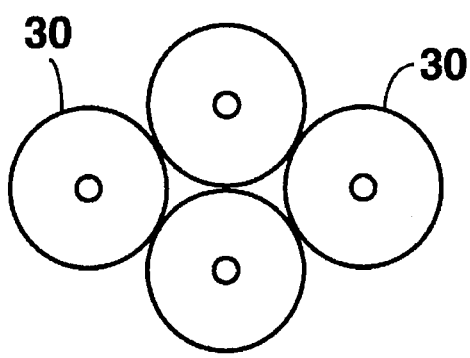
FIG. 5c is an end view of a 2×4 fused fiber coupler, prior to fusing, showing the symmetrical arrangement of the waveguide fibers in the coupling region.

The diamond arrangement of FIG. 5c is suitable for a 2×4 fused fiber coupler. Waveguide fibers 30 are terminated after passing through the coupling or fused region of the coupler. The side view of the 2×4 diamond configuration is shown in FIG. 5d. Waveguide fibers 32 are terminated fibers and waveguide fibers 35 are referred to as through fibers.

Figure 5E:
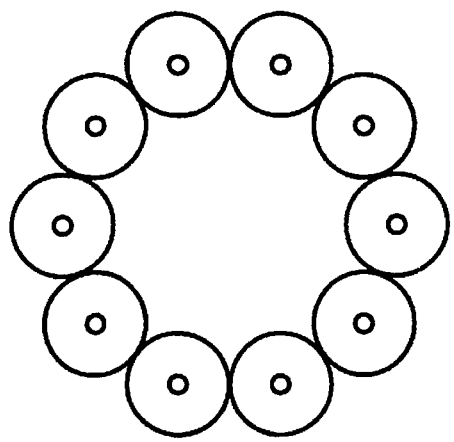
FIG. 5e is an end view of a circular fused fiber array of N fibers, prior to fusing.
Figure 5D:
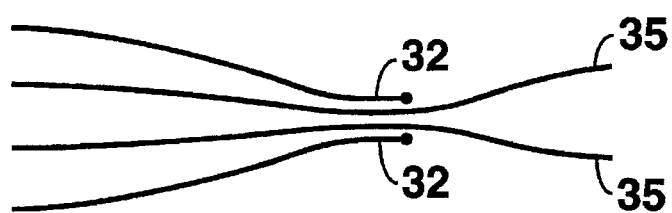
FIG. 5d is a schematic side view of a 2×4 fused fiber coupler showing 2 through fibers and 2 terminated fibers.
Figure 5F:
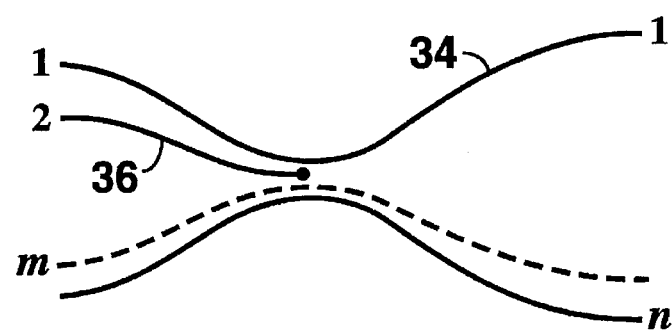
FIG. 5f is a schematic side view of a circular fused fiber army showing some through and some terminated fibers.

For higher fiber count M×N fused waveguide fiber couplers, configurations such as the ring array in FIG. 5e are contemplated. For example, a certain number of the M input fibers may be terminated to provide for N output fibers, wherein M>N. In FIG. 5e, 34 is a through fiber and 36 is a terminated fiber.

Examples of symmetrical 1×N multiclad couplers are shown and discussed in detail in U. S. Pat. No. 5,017,206, Miller et al.

Although specific embodiments of our invention have been disclosed and described hereinabove, the invention is nonetheless limited only by the following claims.

What is claimed is:

1. A device for wavelength division multiplexing and demultiplexing of single mode optical telecommunications signals comprising:

a first evanescent wave coupler device having M input ports and N output ports, wherein signal light power from each of said M input ports is divided substantially equally among said N output ports, and the signal light power having a plurality of wavelengths;

a second evanescent wave coupler device having N input ports and O output ports, the signal light power of each particular wavelength carried, respectively, by each of said N input ports is coupled respectively into a preselected one of said O output ports; and, a plurality of phase shifting means for connecting each of said N output ports of said first coupler, respectively, to a corresponding one of said N input ports of said second coupler, to form N optical path lengths between said first and second evanescent wave couplers, wherein each of the optical paths of said N optical path lengths is unique and provides a unique phase shift to each wavelength of signal light transmitted therethrough.

2. The wavelength division multiplexer and demultiplexer device of claim 1 wherein at least one of said evanescent couplers is a fused waveguide fiber coupler.

3. The wavelength division multiplexing and demultiplexing device of claim 2 wherein said N optical path lengths include planar optical waveguides.

4. The wavelength division multiplexer and demultiplexer device of claim 1 wherein at least one of said evanescent couplers is a planar coupler.

5. The wavelength division multiplexing and demultiplexing device of claim 1 wherein said N optical path lengths comprise optical waveguide fibers each said optical waveguide fiber having a refractive index delta, a length, and a core diameter.

6. The wavelength division multiplexing and demultiplexing device of claim 5 wherein said optical path lengths are varied by varying said refractive index deltas, respectively, of each of said optical waveguide fibers along at least one portion of the length of each of said waveguide fibers.

7. The wavelength division multiplexing and demultiplexing device of claim 5 wherein said optical path lengths are varied by varying the core diameters, respectively, of said optical waveguide fibers along at least one portion of the length of said waveguide fibers.

8. The wavelength division multiplexing and demultiplexing device of claim 5 wherein said optical path lengths are varied by varying the lengths, respectively, of said optical waveguide fibers.

9. The wavelength division multiplexing and demultiplexing device of claim 1 further including adjusting means to adjust said at least one of said optical path lengths over a pre-selected range of optical path lengths.

10. The wavelength division multiplexer and demultiplexer device of claim 1 wherein either M or N is greater than 2.

11. A single mode wavelength division multiplexing and demultiplexing device comprising:

a first fused optical waveguide fiber coupler having at least one input waveguide fiber, at least three output waveguide fibers, and a tapered coupling region wherein said at least one input waveguide fiber and said at least three output waveguide fibers are fused together so that a substantially equal amount of power from said input waveguide fiber is coupled to each said output waveguide fiber;

a second fused optical waveguide fiber coupler having a number of input and output optical waveguide fibers, the number of input waveguide fibers of said second fused optical waveguide fiber coupler at least equal to the number of output waveguide fibers of said first fused optical waveguide fiber coupler, and, a tapered coupling region wherein the input and output waveguide fibers of said second coupler are fused together so that signal power of particular wavelengths in each said input waveguide fiber are coupled respectively to a pre-selected one of said output waveguide fibers; and, a number of dissimilar connecting fibers equal to said number of output fibers of said first fused waveguide fiber coupler, joined between said output of said first fused waveguide fiber coupler and said input of said second waveguide fiber coupler;

wherein each said dissimilar connecting fiber produces a phase shift in a propagating light signal which is different from the phase shift produced by every other said dissimilar connecting fiber.

12. The wavelength division multiplexing and demultiplexing device of claim 11 wherein said dissimilar connecting fibers each have a refractive index delta different from every other said dissimilar connecting fiber along at least a portion of the length of said connecting fiber.

* * * * *